United States Patent
Tudi

(10) Patent No.: US 10,699,572 B2
(45) Date of Patent: Jun. 30, 2020

(54) PASSENGER COUNTING FOR A TRANSPORTATION SYSTEM

(71) Applicant: Carrier Corporation, Palm Beach Gardens, FL (US)

(72) Inventor: Sandeep Reddy Tudi, Telengana (IN)

(73) Assignee: CARRIER CORPORATION, Palm Beach Gardens, FL (US)

(*) Notice: Subject to any disclaimer, the term of this patent is extended or adjusted under 35 U.S.C. 154(b) by 0 days.

(21) Appl. No.: 16/127,401

(22) Filed: Sep. 11, 2018

(65) Prior Publication Data
US 2019/0325748 A1 Oct. 24, 2019

(30) Foreign Application Priority Data
Apr. 20, 2020 (IN) .............................. 201811015016

(51) Int. Cl.
*G06F 17/28* (2006.01)
*G06F 17/27* (2006.01)
*G08G 1/123* (2006.01)
*G01C 21/36* (2006.01)
*G08G 1/00* (2006.01)
*G06K 9/00* (2006.01)

(52) U.S. Cl.
CPC .......... *G08G 1/123* (2013.01); *G01C 21/3697* (2013.01); *G06K 9/00838* (2013.01); *G08G 1/20* (2013.01)

(58) Field of Classification Search
CPC ...... G08G 1/123; G08G 1/20; G06K 9/00838; G01C 21/3697
See application file for complete search history.

(56) References Cited

U.S. PATENT DOCUMENTS

| 1,100,050 A1 | 5/2001 | Renault |
| 6,919,804 B1 | 7/2005 | Cook et al. |
| 9,390,335 B2 | 7/2016 | Lee |
| 9,477,881 B2 | 10/2016 | Konishi |

(Continued)

FOREIGN PATENT DOCUMENTS

| CN | 1797441 A | 7/2006 |
| CN | 201255897 Y | 6/2009 |

(Continued)

OTHER PUBLICATIONS

Google Play App Store, Bus+: Taiwan Bus Tracking, Application, Accessed on Mar. 29, 2018 at https://play.google.com/store/apps/details?id=hearsilent.busplus (3 pp.).

(Continued)

*Primary Examiner* — Anne Marie Antonucci
(74) *Attorney, Agent, or Firm* — Cantor Colburn LLP

(57) ABSTRACT

According to an aspect, a method of passenger counting and vehicle status reporting includes acquiring occupancy data indicative of a number of passengers in a transportation vehicle. The method also includes determining the number of passengers in the transportation vehicle based on the occupancy data and determining a geographic location of the transportation vehicle. An identifier of the transportation vehicle, an indicator of the number of passengers on the transportation vehicle, and the geographic location of the transportation vehicle are provided to a user interface system.

16 Claims, 5 Drawing Sheets

(56) References Cited

U.S. PATENT DOCUMENTS

| | | |
|---|---|---|
| 9,569,902 B2 | 2/2017 | Shibuya et al. |
| 2015/0262006 A1 | 9/2015 | Yomogida et al. |
| 2016/0358388 A1 | 12/2016 | Skoglund et al. |
| 2017/0057316 A1 | 3/2017 | Northrop et al. |
| 2017/0200082 A1 | 7/2017 | Bohm |
| 2017/0286780 A1 | 10/2017 | Zhang et al. |
| 2018/0096599 A1* | 4/2018 | Nagao ............... B61L 15/0027 |
| 2018/0266844 A1* | 9/2018 | Heo ................... G01C 21/3438 |
| 2018/0338225 A1* | 11/2018 | Shimizu ............... H04W 4/046 |

FOREIGN PATENT DOCUMENTS

| | | |
|---|---|---|
| CN | 102324121 A | 1/2012 |
| CN | 102496270 A | 6/2012 |
| CN | 202584249 U | 12/2012 |
| CN | 103021059 A | 4/2013 |
| CN | 203192070 U | 9/2013 |
| CN | 103593974 A | 2/2014 |
| CN | 103985182 A | 8/2014 |
| CN | 104424812 A | 3/2015 |
| CN | 104504377 A | 4/2015 |
| CN | 104821025 A | 8/2015 |
| CN | 105512720 A | 4/2016 |
| CN | 105608883 A | 5/2016 |
| CN | 106056206 A | 10/2016 |
| DE | 102009021215 A1 | 11/2010 |
| EP | 2924663 A1 | 9/2015 |
| EP | 3285231 A1 | 2/2018 |

OTHER PUBLICATIONS

Passenger Counting on Public Buses (1:42), CustomerCounting, YouTube Video published on Oct. 8, 2014, Accessed on Mar. 29, 2018 at https://www.youtube.com/watch?v=b13g6IRcOv0 (4 pp. includes video screenshots).

Retail Sensing: People Counting Systems, Automated Passenger Counting, Accessed on Mar. 29, 2018 at http://www.retailsensing.com/automated-passenger-counting.html (5 pp.).

SmartCount Makes Every Passenger Count! (2:19), MER Group, YouTube Video published on Oct. 25, 2015, Accessed on Mar. 29, 2018 at https://www.youtube.com/watch?v=M-BJxXKBeXQ (5 pp. includes video screenshots).

Syncromatics, Products, Real-Time Passenger Information, Accessed on Mar. 29, 2018 at http://www.syncromatics.com/real-time-passenger-information/ (3 pp.).

* cited by examiner

PASSENGER COUNTING FOR A TRANSPORTATION SYSTEM

CROSS-REFERENCE TO RELATED APPLICATION

This application claims the benefit of the IN Application No. 201811015016 filed Apr. 20, 2018, which is incorporated herein by reference in its entirety.

BACKGROUND

The subject matter disclosed herein generally relates to the field of transportation, and more particularly to passenger counting for a transportation system.

During times of high congestion, many commuters board or plan to board a shared/public transportation vehicle, such as a bus, as part of a transportation system that includes multiple transportation vehicles. Along transportation routes, multiple transportation vehicles may be scheduled to arrive and depart at different times. Commuters waiting for a shared transportation vehicle may be aware of scheduled arrival and departure times but are unaware of whether a later arriving transportation vehicle will be more or less crowded with passengers than an earlier arriving transportation vehicle.

BRIEF SUMMARY

According to one embodiment, a method of passenger counting and vehicle status reporting includes acquiring occupancy data indicative of a number of passengers in a transportation vehicle. The number of passengers in the transportation vehicle is determined based on the occupancy data. A geographic location of the transportation vehicle is determined. An identifier of the transportation vehicle, an indicator of the number of passengers on the transportation vehicle, and the geographic location of the transportation vehicle are provided to a user interface system.

In addition to one or more of the features described above, or as an alternative, further embodiments may include determining an estimated time for the transportation vehicle to reach a planned stop location based on the geographic location of the transportation vehicle and a route map, and providing the estimated time to the user interface system.

In addition to one or more of the features described above, or as an alternative, further embodiments may include acquiring occupancy data indicative of the number of passengers in one or more other transportation vehicles sharing a common route, determining the number of passengers in the one or more other transportation vehicles based on the occupancy data, and providing identifiers of the one or more other transportation vehicles and indicators of the number of passengers on the one or more other transportation vehicles to the user interface system.

In addition to one or more of the features described above, or as an alternative, further embodiments may include where the indicators of the number of passengers on the one or more other transportation vehicles include relative occupancy values versus capacity of the one or more other transportation vehicles.

In addition to one or more of the features described above, or as an alternative, further embodiments may include where the one or more other transportation vehicles include one or more cars linked together in series.

In addition to one or more of the features described above, or as an alternative, further embodiments may include determining one or more geographic locations of the one or more other transportation vehicles, and providing the one or more geographic locations of the one or more other transportation vehicles to the user interface system.

In addition to one or more of the features described above, or as an alternative, further embodiments may include where the occupancy data includes one or more images captured by one or more cameras within the transportation vehicle.

In addition to one or more of the features described above, or as an alternative, further embodiments may include where the occupancy data is based on a count of mobile devices detected within the transportation vehicle.

According to another embodiment, a fleet tracking system includes a communication interface operable to communicate with an onboard monitoring system of a transportation vehicle and a user interface system. The fleet tracking system also includes a processing system and a memory system including computer-executable instructions that, when executed by the processing system, cause the processing system to perform operations. The operations include acquiring occupancy data through the communication interface from the onboard monitoring system indicative of a number of passengers in the transportation vehicle. The operations also include determining the number of passengers in the transportation vehicle based on the occupancy data and a geographic location of the transportation vehicle. The operations further include providing an identifier of the transportation vehicle, an indicator of the number of passengers on the transportation vehicle, and the geographic location of the transportation vehicle to the user interface system through the communication interface.

In addition to one or more of the features described above, or as an alternative, further embodiments may include where the fleet tracking system is further configured to perform determining an estimated time for the transportation vehicle to reach a planned stop location based on the geographic location of the transportation vehicle and a route map, and providing the estimated time to the user interface system.

In addition to one or more of the features described above, or as an alternative, further embodiments may include where the fleet tracking system is further configured to perform acquiring occupancy data indicative of the number of passengers in one or more other transportation vehicles sharing a common route, determining the number of passengers in the one or more other transportation vehicles based on the occupancy data, and providing identifiers of the one or more other transportation vehicles and indicators of the number of passengers on the one or more other transportation vehicles to the user interface system.

In addition to one or more of the features described above, or as an alternative, further embodiments may include where the fleet tracking system is further configured to perform determining one or more geographic locations of the one or more other transportation vehicles, and providing the one or more geographic locations of the one or more other transportation vehicles to the user interface system.

In addition to one or more of the features described above, or as an alternative, further embodiments may include where the occupancy data is based on one or more of: image data from at least one camera and a count of mobile devices detected within the transportation vehicle.

According to another embodiment, an onboard monitoring system of a transportation vehicle includes a communication interface operable to communicate with a fleet tracking system, a processing system, and a memory system including computer-executable instructions that, when executed by the processing system, cause the processing system to perform operations. The operations include capturing occupancy data indicative of a number of passengers in the transportation vehicle, determining a geographic location of the transportation vehicle, and providing an identifier of the transportation vehicle, the occupancy data, and the geographic location of the transportation vehicle to the fleet tracking system through the communication interface.

In addition to one or more of the features described above, or as an alternative, further embodiments may include where the onboard monitoring system is further configured to perform triggering the capturing of occupancy data based on determining that the transportation vehicle is in motion.

In addition to one or more of the features described above, or as an alternative, further embodiments may include a motion sensor operable to indicate whether the transportation vehicle is in motion.

In addition to one or more of the features described above, or as an alternative, further embodiments may include where determining the geographic location is based on data from a global positioning system device in the transportation vehicle.

In addition to one or more of the features described above, or as an alternative, further embodiments may include at least one camera operable to periodically capture one or more images or a video feed as the occupancy data.

In addition to one or more of the features described above, or as an alternative, further embodiments may include where the occupancy data is based on a count of mobile devices detected within the transportation vehicle.

Technical effects of embodiments of the present disclosure include efficiently determining a number of passengers on one or more transportation vehicles and vehicle locations, summarizing the resulting data, and providing the resulting data to one or more user interface systems.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

As will be described below, embodiments determine the number of passengers in a transportation vehicle and can also determine a geographic location of the transportation vehicle across a fleet of transportation vehicles. This information can be supplied to one or more user interface systems at one or more stop locations to assist users in deciding whether the board an earlier or later arriving transportation vehicle which may be less congested. Occupancy data can be in the form of images/video acquired by a camera system within the transportation vehicle that captures images of passengers for occupant counting. The image data can be locally processed within the transportation vehicle or sent to a server, such as a fleet tracking system, to determine an occupancy count based on image data and/or other data. The results can be sent to one or more user interface systems. Processing the occupancy data remotely with respect to the user interface systems can improve network performance and efficiency as compared to sending higher bandwidth image data through to the user interface systems for local processing.

Figure 1:
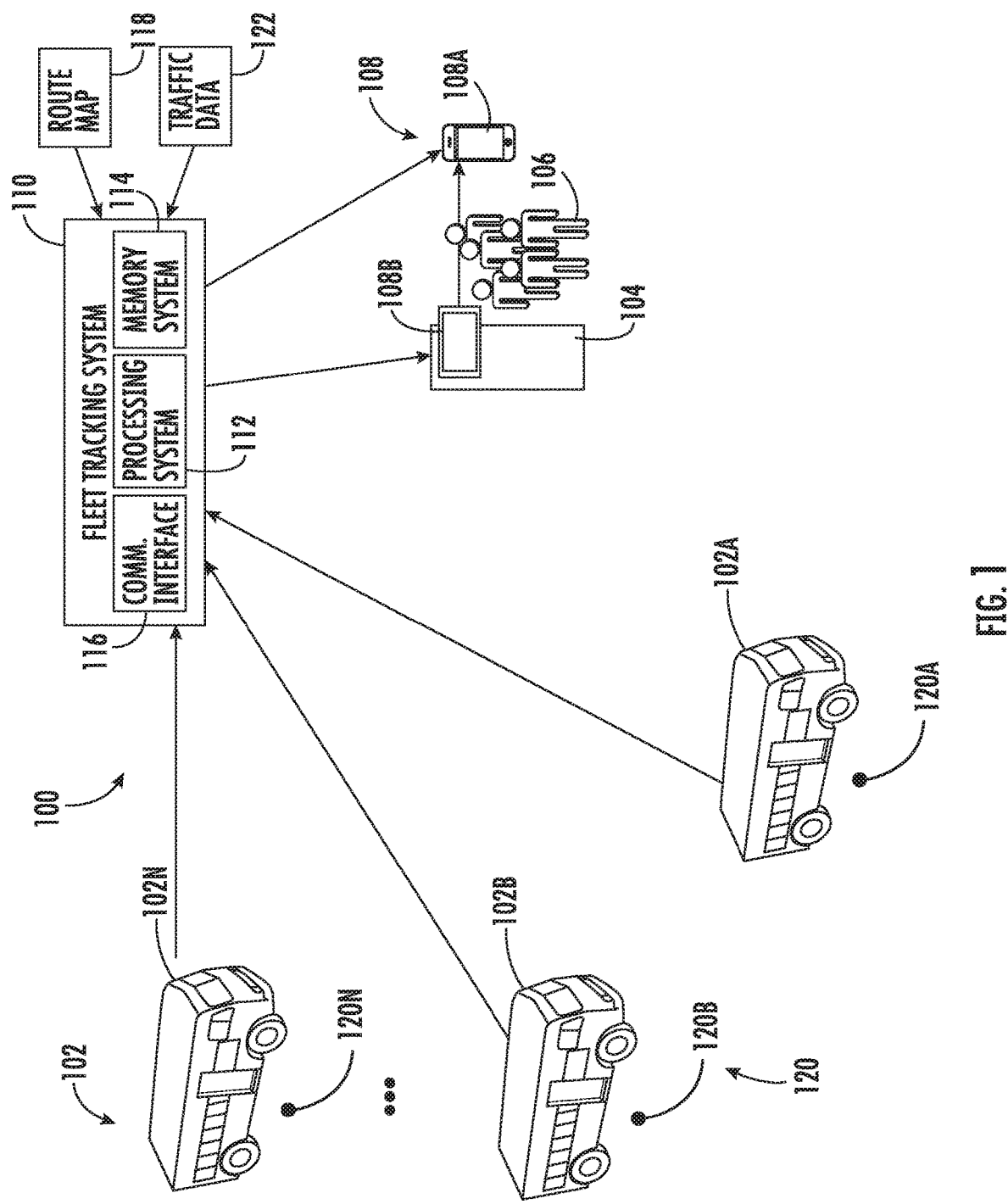
FIG. 1 illustrates a general schematic system diagram of a passenger counting and vehicle status reporting system, in accordance with an embodiment of the disclosure.

With reference to FIG. 1, a system 100 for passenger counting and vehicle status reporting is illustrated, in accordance with an embodiment of the present disclosure. As seen in FIG. 1, a plurality of transportation vehicles 102A, 102B, . . . , 102N (generally, transportation vehicles 102) are depicted along one or more routes to a stop location 104. One or more people 106 may be waiting at the stop location 104 to board one of the transportation vehicles 102. An arrival schedule of the vehicles 102 may be pre-published indicating an expected operation schedule; however, traffic variations in the routes of the transportation vehicles 102 may result in differences of actual arrival time of the stop location 104. Variations in occupancy of the transportation vehicles 102 can also lead to changes in actual arrival times. As one example, transportation vehicle 102A and transportation vehicle 102B may operate on the same route and start spaced fifteen minutes apart in time. Due to traffic conditions, the transportation vehicle 102A may be stuck in traffic, and transportation vehicle 102B may close the gap behind transportation vehicle 102A. The more time that transportation vehicle 102A is stuck in traffic, the passenger occupancy may continue to increase at subsequent stops as the longer delay allows for larger crowds to accumulate at stops along the route. This shifting of passengers can result in lower occupancy in transportation vehicle 102B. It may not be generally known how much actual delay time will exist before transportation vehicle 102B reaches stop location 104 or whether there is likely more seating space available on transportation vehicle 102B as compared with transportation vehicle 102A. People 106 at the stop location 104 may crowd into transportation vehicle 102A even though, unknown to them, transportation vehicle 102B may only be several minutes behind transportation vehicle 102A and have a lower occupancy. Embodiments efficiently collect occupancy and location data related to the transportation vehicles 102 and provide the information to one or more user interface systems 108 to support informed boarding selection with respect to the transportation vehicles 102.

The one or more user interface systems 108 can include, for example, mobile devices as user interface systems 108A and/or one or more fixed displays as user interface systems 108B at or proximate to the stop location 104. User interface systems 108A can include any type of personal computing device, wearable computer, smart watch, smart phone, tablet computer, mobile phone, and the like. User interface systems 108B can be any type of substantially fixed display, such as, a computer monitor, a scrolling display board, a sequence of lights, or other controllable display type at the stop location 104. In some embodiments, the user interface systems 108B are operable to communicate with user interface systems 108A. For example, data received at user interface systems 108B may be wirelessly broadcast to user interface systems 108A in proximity to user interface systems 108B. Such an approach can reduce network loads with respect to a fleet tracking system 110 that may communicate with user interface systems 108A when the user interface systems 108A are not within communication range of the user interface systems 108B. For instance, in some embodiments, user interface systems 108B may be omitted, unavailable, or unable to establish communication.

The fleet tracking system 110 can include a communication interface 116 operable to communicate with an onboard monitoring system 210 (FIG. 2) of transportation vehicles 102 and one or more user interface systems 108. The fleet tracking system 110 can also include a processing system 112 and a memory system 114 with computer-executable instructions that, when executed by the processing system 112, cause the processing system 112 to perform operations as further described herein. The fleet tracking system 110 can acquire occupancy data through the communication interface 116 from the onboard monitoring system 210 indicative of a number of passengers 206 (FIG. 2) in the transportation vehicle 102 and determine the number of passengers 206 in the transportation vehicle 102 based on the occupancy data. The fleet tracking system 110 can also determine a geographic location 120 of the transportation vehicle 102 and provide an identifier of the transportation vehicle 102, an indicator of the number of passengers 206 on the transportation vehicle 102, and the geographic location 120 of the transportation vehicle 102 to the user interface systems 108 through the communication interface 116. Each of the transportation vehicles 102A, 102B, 102N are at different corresponding geographic locations 120A, 120B, 120N at a given point in time. The fleet tracking system 110 can access a route map 118 and traffic data 122 to determine estimated arrival times for the transportation vehicles 102 at the stop location 104. The traffic data 122 may be provided by a third party and updated in real-time based on known traffic reporting techniques.

The processing system 112 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory system 114 may be a storage device such as, for example, a random access memory (RAM), read only memory (ROM), or other electronic, optical, magnetic or any other computer readable storage medium.

The communication interface 116 may have the capability to establish and maintain wireless connectivity over various networks (e.g., Internet, Wi-Fi, Bluetooth, Z-Wave, ZigBee, etc.) with the onboard monitoring system 210 of multiple transportation vehicles 102 and user interface systems 108 at the stop location 104 and other stop locations (not depicted). In some embodiments, the communication interface 116 can communication using multiple networks with various bandwidths and security settings. For example, communication to acquire traffic data 122 may be over a public Internet connection, communication with the onboard monitoring system 210 may be through a cellular link, and communication with the user interface systems 108 may include Wi-Fi, wired links, and/or other types of communication known in the art.

Figure 2:
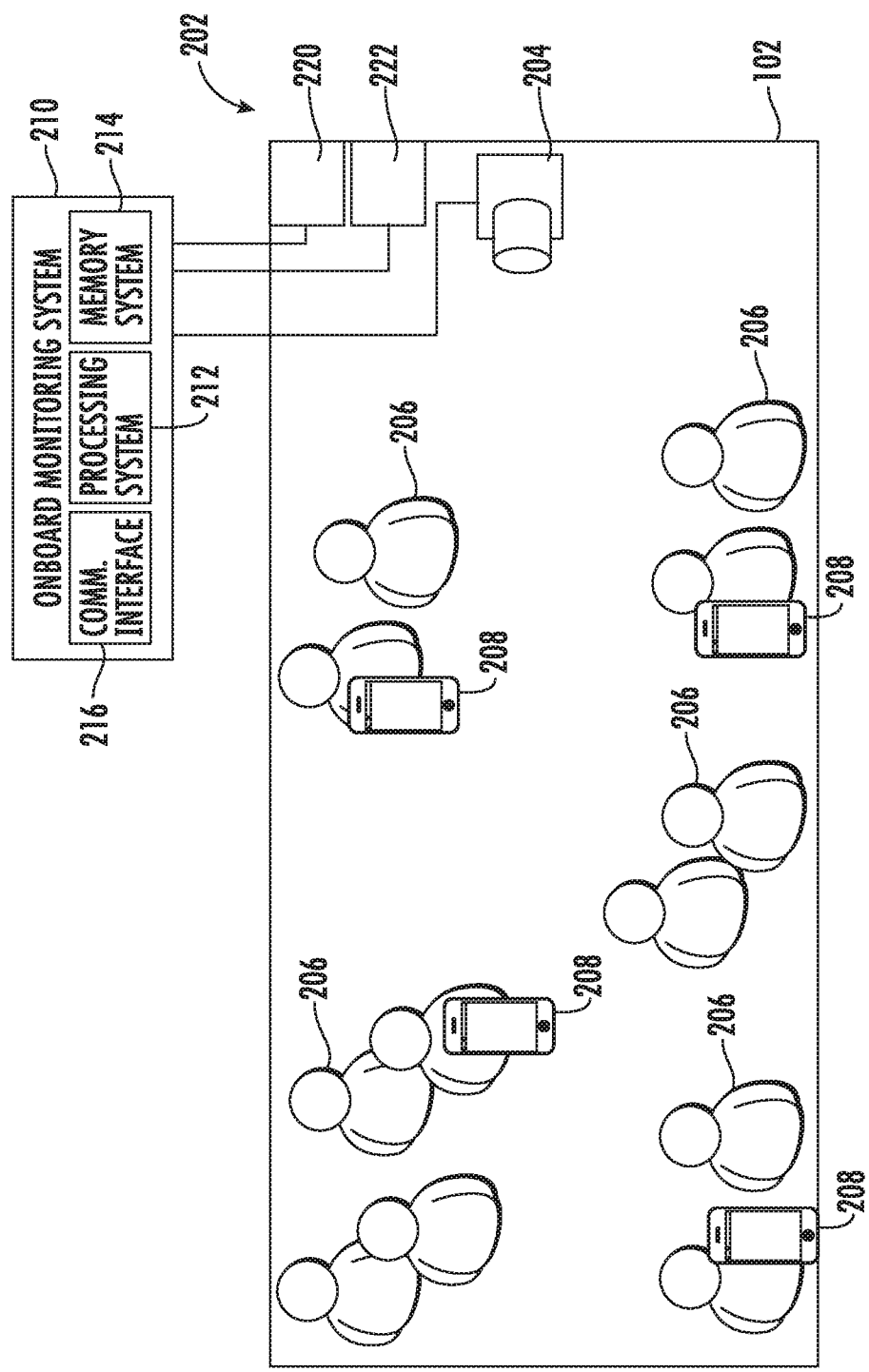
FIG. 2 illustrates a general schematic system diagram of an onboard monitoring system for a transportation vehicle, in accordance with an embodiment of the disclosure.

FIG. 2 depicts an onboard monitoring system 210 of a transportation vehicle 102 and sensors 202 operable to monitor the transportation vehicle 102 and count passengers 206. The onboard monitoring system 210 can include a communication interface 216 operable to communicate with the fleet tracking system 110, a processing system 212, and a memory system 214 including computer-executable instructions that, when executed by the processing system 212, cause the processing system 212 to perform operations as further described herein. For example, the onboard monitoring system 210 can capture occupancy data indicative of a number of passengers in the transportation vehicle and determine a geographic location of the transportation vehicle 102. The sensors 202 can include at least one camera 204 operable to periodically capture one or more images or a video feed as the occupancy data. Alternatively or additionally, the occupancy data can be based on a count of mobile devices 208 detected within the transportation vehicle 102. Geographic location can be determined based on data from a global positioning system device 220 as one of the sensors 202 in the transportation vehicle 102. A motion sensor 222 can also be used to assist in determining a speed of travel and to trigger counting of the passengers 206. For example, when the transportation vehicle 102 is in motion, the occupant count should be stable, but when the transportation vehicle 102 is stopped, passengers 206 may board or exit making it more difficult to get an accurate occupant count. Examples of the motion sensor 222 can include an accelerometer, a velocity sensor, or an existing onboard speedometer of the transportation vehicle 102.

The onboard monitoring system 210 can provide an identifier of the transportation vehicle 102, the occupancy data, and the geographic location of the transportation vehicle 102 to the fleet tracking system 110 of FIG. 1 through the communication interface 216, for instance, using a cellular link or other communication format known in the art.

One or more cameras 204 can be located on a wall and/or ceiling within the transportation vehicle 102. The onboard monitoring system 210 may be configured to visually recognize a feature, such as a face or body of passengers 206, and send images including passengers 206 to the fleet tracking system 110 of FIG. 1 for further processing. Alternatively, the onboard monitoring system 210 may perform object classification and pattern recognition to determine occupant count locally and send the occupant count data to the fleet tracking system 110. Identification of passengers 206 in images can be performed using any known image processing techniques known in the art capable of distinguishing and identifying people in images. Examples can include facial recognition, pattern recognition, movement recognition, and the like. Alternatively or additionally, the onboard monitoring system 210 can detect and count a number of mobile devices 208 onboard the transportation vehicle 102 to estimate or check occupant counts. For instance, mobile devices 208 connecting or attempting to connect to a local Wi-Fi network on the transportation vehicle 102 can be counted. Other communication signals, such as Bluetooth signals with device identifiers, emitted by the mobile devices 208 may be detected and counted by the onboard monitoring system 210.

Figure 3:
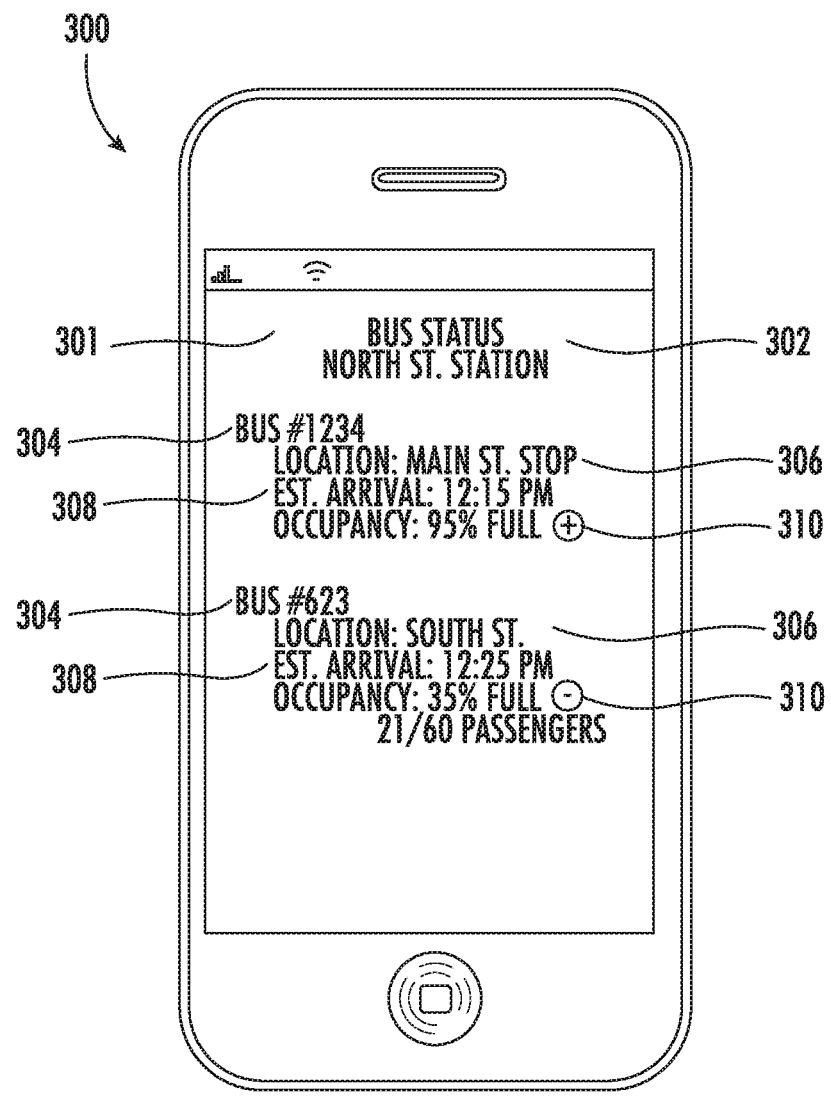
FIG. 3 illustrates a user interface system, in accordance with an embodiment of the disclosure.

FIG. 3 illustrates a user interface 301 of a mobile device 300 that is an embodiment of the user interface systems 108 of FIG. 1. The user interface 301 may also be available to mobile devices 208 of FIG. 2 to view estimated arrival times and plan transfers to other transportation vehicles 102 at an upcoming stop or station. In the example of FIG. 3, the user interface 301 displays location data 302 indicating a reference point for arrival time estimates. The user interface 301 can display information such as identifiers 304 of transportation vehicles 102 scheduled to arrive at the location identified by the location data 302. The user interface 301 can also display geographic locations 306 of the transportation vehicles 102 and an estimated time of arrival 308 of the transportation vehicles 102. The user interface 301 can also display an indicator of the number of passengers 310 on the transportation vehicles 102. The indicator of the number of passengers 310 may be provided in various formats, such as percentage full, descriptive words (e.g., low occupancy, moderate occupancy, high occupancy, maximum occupancy), and/or actual count values. It will be understood that the example of FIG. 3 is non-limiting and many variations of the user interface 301 are possible.

Figure 4:
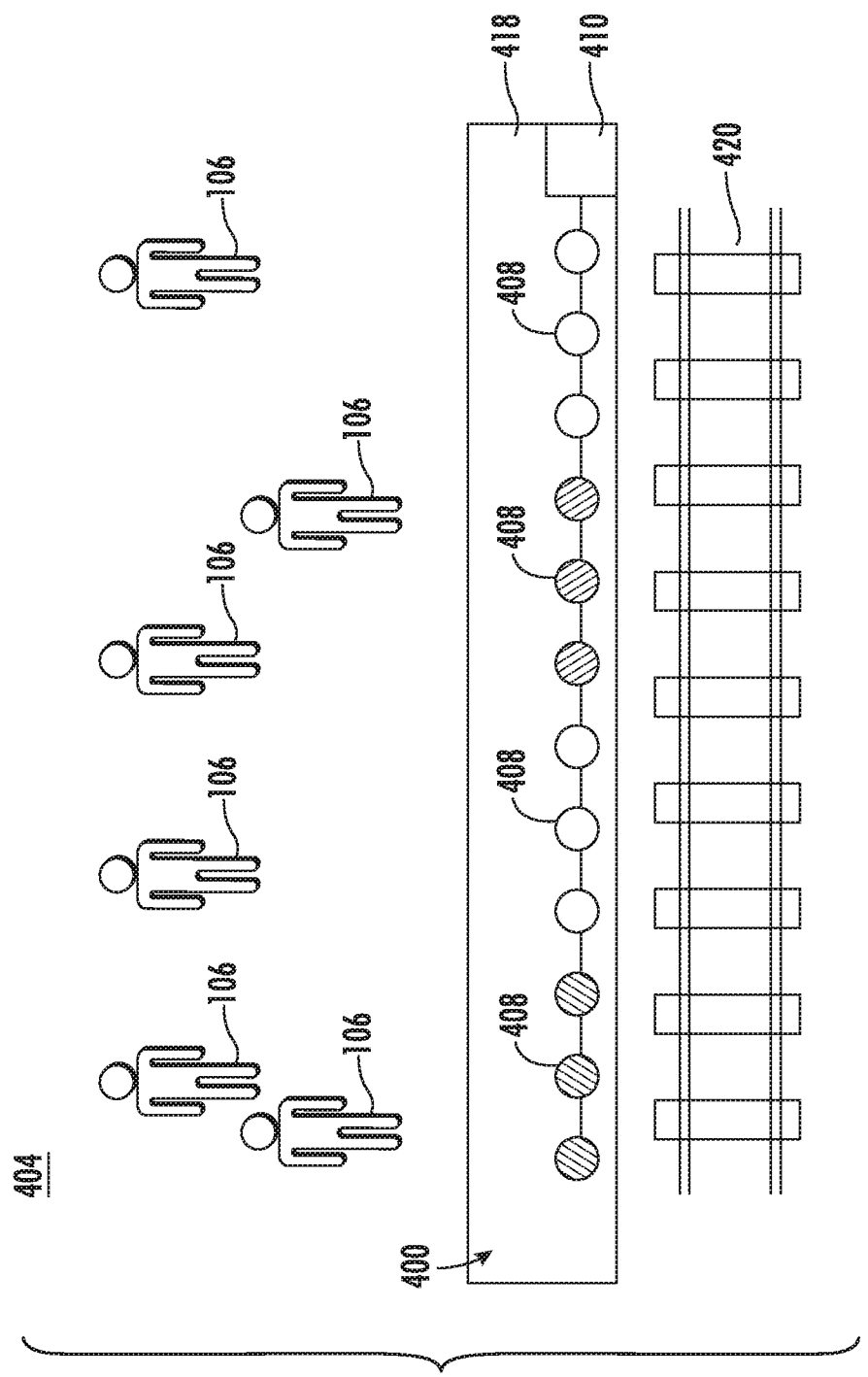
FIG. 4 illustrates a general schematic system diagram of a vehicle status reporting system, in accordance with an embodiment of the disclosure.

FIG. 4 depicts a general schematic system diagram of a vehicle status reporting system 400 in accordance with an embodiment. A stop location 404 of FIG. 4 can be a train, tram, light rail, subway, or similar station for embodiments where the transportation vehicle 102 of FIG. 1 includes one or more cars linked together in series, such as train cars. The vehicle status reporting system 400 includes an interface controller 410 that can be linked to an embodiment of the fleet tracking system 110 of FIG. 1 for a rail system 420. A user interface of the vehicle status reporting system 400 can be embodied as a series of lights 408 or other indicators that may vary in intensity, color, blinking patterns, and the like as an indicator of the number of passengers on the cars of the transportation vehicle 102. In the example of FIG. 4, the series of lights 408 are located along a platform 418 and driven by the interface controller 410 to indicate a level of occupancy (e.g., more or less full) where cars of the transportation vehicle 102 are expected to stop along the platform 418. This can assist in determining where the people 106 position themselves prior to arrival of the transportation vehicle 102, where the cars of the transportation vehicle 102 have occupancy sensing as described with respect to FIG. 2.

Figure 5:
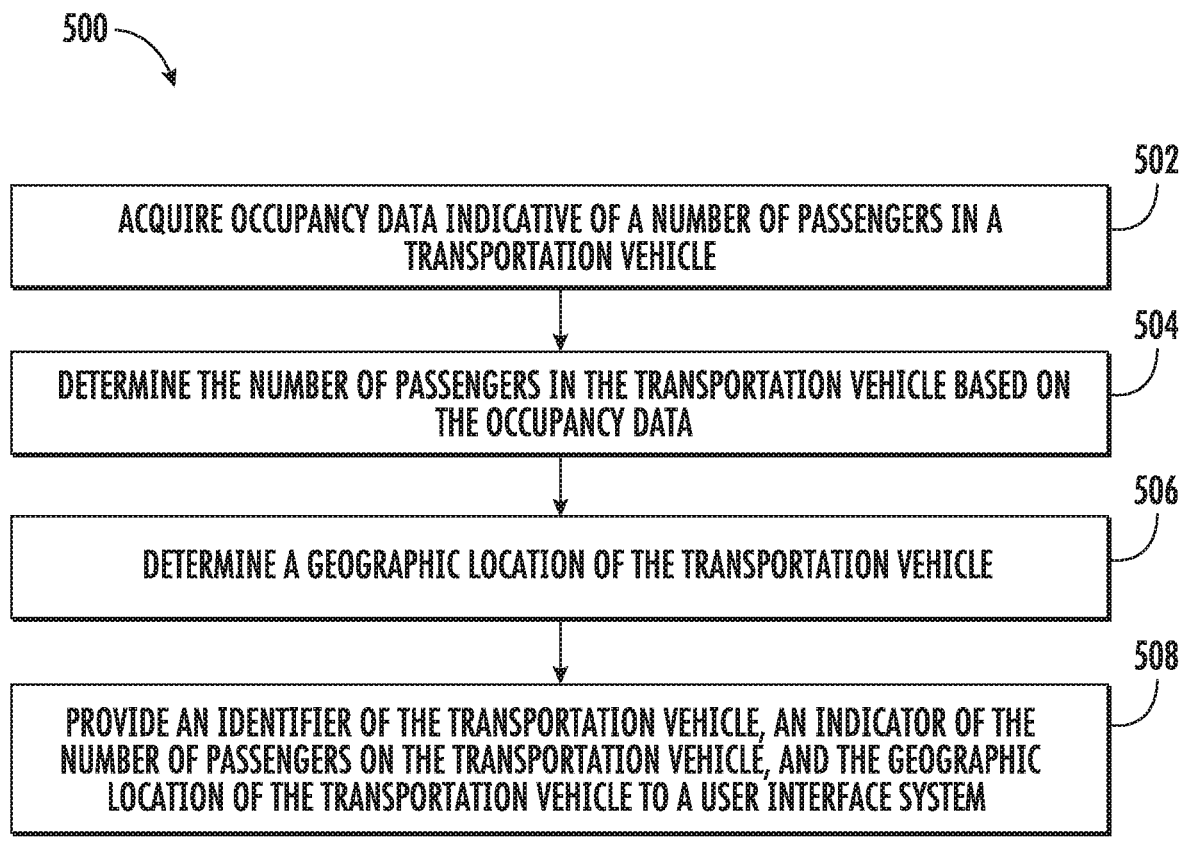
FIG. 5 is a flow diagram illustrating a method, according to an embodiment of the present disclosure.

Referring now to FIG. 5 with continued reference to FIGS. 1-4, FIG. 5 depicts a flow chart of a method 500 of passenger counting and vehicle status reporting in accordance with an embodiment of the disclosure. The method 500 can be performed by the fleet tracking system 110, the onboard monitoring system 210, and/or other elements of systems 100 or 400.

At block 502, occupancy data can be acquired by the fleet tracking system 110 from the onboard monitoring system 210 of a transportation vehicle 102, where the occupancy data is indicative of a number of passengers 206, 310 in a transportation vehicle 102. The occupancy data can include one or more images captured by one or more cameras 204 within the transportation vehicle 102. In some embodiments, the occupancy data is based on a count of mobile devices 208 detected within the transportation vehicle 102.

At block 504, the fleet tracking system 110 can determine the number of passengers 206, 310 in the transportation vehicle 102 based on the occupancy data. Alternatively, the onboard monitoring system 210 can determine the number of passengers 206, 310 in the transportation vehicle 102 based on the occupancy data.

At block 506, a geographic location 120, 306 of the transportation vehicle 102 is determined. The geographic location 120, 306 of the transportation vehicle 102 can be determined using a global positioning system device 220.

At block 508, the fleet tracking system 110 can provide an identifier 304 of the transportation vehicle 102, an indicator of the number of passengers 206, 310 on the transportation vehicle 102, and the geographic location 120, 306 of the transportation vehicle 102 to a user interface system 108, which may include interface controller 410. The fleet tracking system 110 or the onboard monitoring system 210 may also determine an estimated time of arrival 308 for the transportation vehicle 102 to reach a planned stop location 104 as location data 302 based on the geographic location 120, 306 of the transportation vehicle 102 and a route map 118. The fleet tracking system 110 can provide the estimated time of arrival 308 to the user interface system 108.

The fleet tracking system 110 can acquire occupancy data indicative of the number of passengers 206, 310 in one or more other transportation vehicles 102 sharing a common route and determine the number of passengers 206, 310 in the one or more other transportation vehicles 102 based on the occupancy data. The fleet tracking system 110 can provide identifiers 304 of the one or more other transportation vehicles 102 and indicators of the number of passengers 206, 310 on the one or more other transportation vehicles 102 to the user interface system 108. The fleet tracking system 110 can determine one or more geographic locations 120, 306 of the one or more other transportation vehicles 102 and may provide the one or more geographic locations 120, 306 of the one or more other transportation vehicles 102 to the user interface system 108.

The indicators of the number of passengers 206, 310 on the one or more other transportation vehicles 102 may include relative occupancy values versus capacity of the one or more other transportation vehicles 102, such as percentages, lights mapping to levels of empty/full, gauge displays, bar displays, and/or words indicating relative degrees of empty/full levels.

Various user interface systems 108A, 108B can receive similar data from the fleet tracking system 110 while at a same stop location 104. The data can be customized based a desired transportation line where multiple transportation lines share a stop location, and the process can be repeated for user interface systems 108 distributed across a plurality of stop locations 104.

While the above description has described the flow process of FIG. 5 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of passenger counting and vehicle status reporting, the method comprising:
    monitoring a motion sensor of a transportation vehicle to determine whether the transportation vehicle is in motion;
    initiating detection of a plurality of mobile devices on the transportation vehicle based on the motion sensor detecting that the transportation vehicle is in motion;
    capturing occupancy data indicative of a number of passengers in the transportation vehicle based on a count of the mobile devices attempting to connect to a local network of the transportation vehicle after motion of the transportation vehicle is detected;
    determining the number of passengers in the transportation vehicle based on the occupancy data;
    determining a geographic location of the transportation vehicle; and
    providing an identifier of the transportation vehicle, an indicator of the number of passengers on the transportation vehicle, and the geographic location of the transportation vehicle to a user interface system.

2. The method of claim 1, further comprising:
    determining an estimated time for the transportation vehicle to reach a planned stop location based on the geographic location of the transportation vehicle and a route map; and
    providing the estimated time to the user interface system.

3. The method of claim 1, further comprising:
    acquiring occupancy data indicative of the number of passengers in one or more other transportation vehicles sharing a common route;
    determining the number of passengers in the one or more other transportation vehicles based on the occupancy data; and
    providing identifiers of the one or more other transportation vehicles and indicators of the number of passengers on the one or more other transportation vehicles to the user interface system.

4. The method of claim 3, wherein the indicators of the number of passengers on the one or more other transportation vehicles comprise relative occupancy values versus capacity of the one or more other transportation vehicles.

5. The method of claim 3, wherein the one or more other transportation vehicles comprise one or more cars linked together in series.

6. The method of claim 3, further comprising:
    determining one or more geographic locations of the one or more other transportation vehicles; and
    providing the one or more geographic locations of the one or more other transportation vehicles to the user interface system.

7. The method of claim 1, wherein the occupancy data further comprises one or more images captured by one or more cameras within the transportation vehicle.

8. A fleet tracking system, comprising:
    a communication interface operable to communicate with an onboard monitoring system of a transportation vehicle and a user interface system;
    a processing system; and
    a memory system comprising computer-executable instructions that, when executed by the processing system, cause the processing system to perform operations, the operations comprising:
        acquiring occupancy data through the communication interface from the onboard monitoring system indicative of a number of passengers in the transportation vehicle by:
            monitoring a motion sensor of the transportation vehicle to determine whether the transportation vehicle is in motion;
            initiating detection of a plurality of mobile devices on the transportation vehicle based on the motion sensor detecting that the transportation vehicle is in motion; and
            capturing the occupancy data indicative of the number of passengers in the transportation vehicle based on a count of the mobile devices attempting to connect to a local network of the transportation vehicle after motion of the transportation vehicle is detected;
        determining the number of passengers in the transportation vehicle based on the occupancy data;
        determining a geographic location of the transportation vehicle; and
        providing an identifier of the transportation vehicle, an indicator of the number of passengers on the transportation vehicle, and the geographic location of the transportation vehicle to the user interface system through the communication interface.

9. The fleet tracking system of claim 8, wherein the fleet tracking system is further configured to perform the operations comprising:
    determining an estimated time for the transportation vehicle to reach a planned stop location based on the geographic location of the transportation vehicle and a route map; and
    providing the estimated time to the user interface system.

10. The fleet tracking system of claim 9, wherein the fleet tracking system is further configured to perform the operations comprising:

acquiring occupancy data indicative of the number of passengers in one or more other transportation vehicles sharing a common route;

determining the number of passengers in the one or more other transportation vehicles based on the occupancy data; and providing identifiers of the one or more other transportation vehicles and indicators of the number of passengers on the one or more other transportation vehicles to the user interface system.

11. The fleet tracking system of claim 10, wherein the indicators of the number of passengers on the one or more other transportation vehicles comprise relative occupancy values versus capacity of the one or more other transportation vehicles.

12. The fleet tracking system of claim 11, wherein the occupancy data further comprises one or more images captured by one or more cameras within the transportation vehicle.

13. The fleet tracking system of claim 10, wherein the fleet tracking system is further configured to perform the operations comprising:

determining one or more geographic locations of the one or more other transportation vehicles; and providing the one or more geographic locations of the one or more other transportation vehicles to the user interface system.

14. An onboard monitoring system of a transportation vehicle, the onboard monitoring system comprising:

a communication interface operable to communicate with a fleet tracking system;

a motion sensor;

a processing system; and a memory system comprising computer-executable instructions that, when executed by the processing system, cause the processing system to perform operations, the operations comprising:

monitoring the motion sensor to determine whether the transportation vehicle is in motion;

initiating detection of a plurality of mobile devices on the transportation vehicle based on the motion sensor detecting that the transportation vehicle is in motion;

capturing occupancy data indicative of a number of passengers in the transportation vehicle based on a count of the mobile devices attempting to connect to a local network of the transportation vehicle after motion of the transportation vehicle is detected;

determining a geographic location of the transportation vehicle; and providing an identifier of the transportation vehicle, the occupancy data, and the geographic location of the transportation vehicle to the fleet tracking system through the communication interface.

15. The onboard monitoring system of claim 14, wherein determining the geographic location is based on data from a global positioning system device in the transportation vehicle.

16. The onboard monitoring system of claim 14, further comprising at least one camera operable to periodically capture one or more images or a video feed as part of the occupancy data.

* * * * *